United States Patent Office 3,431,243
Patented Mar. 4, 1969

3,431,243
PROCESS FOR PREPARATION OF POLY(ETHYL-
ENE TEREPHTHALATE) FROM COMPRESSED
TEREPHTHALIC ACID
Seiji Uno, Seiji Kazama, and Fumio Uno, Iwakuni-shi,
Yamaguchi-ken, Japan, assignors to Teijin Limited,
Osaka, Japan, a corporation of Japan
No Drawing. Filed Dec. 4, 1963, Ser. No. 328,098
U.S. Cl. 260—75                                    6 Claims
Int. Cl. C08g 17/04

This invention relates to a process for preparation of terephthalic acid component suited as the material for polyester production by direct esterification. The invention also relates to a process for preparation of linear polyesters using the said terephthalic acid.

In the past, industrial scale preparation of linear polyesters of which main acid component is terephthalic acid and which can be formed into shaped articles such as fiber or film has been carried out by condensation polymerization of bis-(hydroxyalkyl)-terephthalate or of a low molecular weight polymer thereof obtained by ester-interchange reaction between a dialkyl terephthalate and a glycol.

Thus, heretofore terephthalic acid was not directly reacted with a glycol, but was first converted to its dialkyl ester to be reacted with a glycol, because the alkyl esters can be refined with greater ease and to a higher degree than terephthalic acid, and also because they are soluble in glycols under heating so as to perform a homogenous reaction, consequently producing polyesters of excellent color tone and properties. However, if it could be possible to react terephthalic acid directly with an alkylene glycol to form bis-(hydroxyalkyl)-terephthalate or a low molecular weight polymer thereof, and subsequently, linear polyester, the step of preparation of dialkyl terephthalate can be omitted and its economical advantage would be indeed great.

For simplifying, we will hereafter refer to such a process for producing polyesters by direct reaction of terephthalic acid or mixtures of terephthalic acid with other organic bifunctional acid or acids with glycol as "direct esterification method for preparation of polyesters," and to the terephthalic acid or the mixtures of terephthalic acid with other organic bifunctional acid or acids to be used as a material for the direct esterification as "terephthalic acid component."

Techniques for preparation of polyesters by direct esterification have recently been developed because of the economical advantage of the process. For example, U.S. Patent Nos. 2,465,319 and 3,050,533 disclose a part of such techniques. We also have made an extensive research on the direct esterification process and found a satisfactory method of refining terephthalic acid.

However, as well known, the direct esterification is a heterogeneous phase reaction, i.e., solid-liquid system, because terephthalic acid is hard-soluble in glycol, and the reaction is carried out in slurry state. Therefore, for example, when direct esterification is carried out at the mol ratio of ethylene glycol to terephthalic acid 1–3 as in U.S. Patent No. 3,050,533, the reaction mixture becomes thick or slurry of high concentration in the early stage of the reaction, and a great power is required to stir the same. Furthermore, a uniform mixing of the reaction product becomes difficult. Consequently, not only the quality of the polymer obtained by the condensation polymerization is adversely affected and its color tone is impaired, but also the control of the polymer quality is made very difficult. This tendency is increased in industrial scale reactors. On the other hand, if a large amount of ethylene glycol is used to lower the apparent viscosity of the reaction mixture and to form a slurry of low concentration, the direct esterification using the same is economically disadvantageous in that the amount of ethylene glycol to be recovered is increased. Furthermore, the greater the amount of alkylene glycol used, the more the polyester formed by etherification of the alkylene glycol, and the resultant lowering in the softening point of the product polyester becomes remarkable. Therefore, it is objectionable to use a large excess of ethylene glycol than that necessary for the direct esterification reaction.

We looked for a process for carrying out the reaction with industrial advantages through laborious researches, and arrived at the present invention.

That is, we discovered that by compressing terephthalic acid component and thereafter optionally crushing the same to make its bulk density at least 0.8, and its average particle diameter not more than 8 mm., such terephthalic acid component suited as the material for preparation of polyesters by direct esterification can be obtained.

In this invention, the "bulk density" and "average particle diameter" are defined as follows.

Bulk density (BD)

In a 200 cc. graduated cylinder, the sample is lightly charged without any compressing to about 80% of the capacity of said cylinder. After tapping of the cylinder at the bottom three times with the palm of hand, the volume of the sample (Vcc.) is measured, and then its weight (Wg.) is measured. The bulk density (BD) is defined by the equation below.

$$BD = W/V \ (g./cc.)$$

Average particle diameter

"Particle diameter" ($Ds$) is defined as the diameter of a spheroid having the equal volume as of the particle, and is expressed by the following formula;

$$Ds = \left(\frac{6}{\pi} \cdot V\right)^{1/3} (\text{mm.})$$

wherein V being the volume of the particle (mm.$^3$).

The average particle diameter of the sample ($Dave$) is defined as follows:

$$Dave = \left(\frac{\sum Dsi^3 Ni}{\sum Ni}\right)^{1/3} (\text{mm.})$$

wherein $Dsi$ being a diameter of a certain particle, and $Ni$ being the number of the particles having the particle diameter ($Dsi$) in the sample.

Note that when the particles are very fine, calculation of the average particle diameter of the sample by the above formula is difficult, but logically its average particle diameter will be below 8 mm.

In this invention, it is preferred to compress terephthalic acid or a mixture of terephthalic acid with other organic bifunctional acid or acids and thereafter optionally to crush the same to make its bulk density at least 0.9, and its average particle diameter not more than 8 mm.

Among the processes for preparation of terephthalic acid, one which is very important is the method comprising heating a di- or mono-alkali salt of an aromatic carboxylic acid such as dipotassium phthalate or potassium benzoate in an inert gaseous atmosphere to a temperature of about 360°–460° C. to cause the thermal rearrangement thereof to convert the same to a dialkali terephthalate, and further reacting the same with a substance which forms an acid upon dissolving in water such as a mineral acid, an organic acid, carbon dioxide gas or sulphurous anhydride. Another useful method of refining to produce high purity terephthalic acid comprises converting terephthalic acid or derivatives thereof obtained by process other than the above-described to the corresponding metal salt or ammonium salt, subjecting the same to refining and other optional treatments, and then reacting the same with a substance which forms an acid upon dissolving in water such as a mineral acid, an organic acid, carbon dioxide gas or sulphurous anhydride.

However, the bulk density of thus prepared terephthalic acid is in the order of 0.3–0.6, allowing minor variations depending on the production conditions employed.

According to the invention, such terephthalic acid having a bulk density less than 0.8, or a mixture of such terephthalic acid with other organic bifunctional acid or acids is compressed and made to have a bulk density of at least 0.8. It is permissible to shape the same simultaneously with the compressing.

To achieve the above purpose, terephthalic acid powder may be charged in a pressure container and compressed under an elevated pressure, or the powder may be passed through the space between two rotating rollers to be compressed. In the former case, the capacity and the shape of the container may be so selected that the compressing operation can be carried out in such a manner as for formation of medicinal tablets. By so doing, it is possible to make the average particle diameter of the compressed product not more than 8 mm. However, when the capacity of the container causes the average particle diameter of the product to become greater than 8 mm., or in case two rotating rollers (it is permissible that only one of the two is positively driven) are employed for the compression, normally it is necessary that the compressed product be crushed to have its average particle diameter reduced to not more than 8 mm., while of course there are exceptions. The shape of the compressed terephthalic acid needs not be uniform, but pieces of various shapes may be present. Again the compressing means or compressing and shaping means are not limited to the above-described, but any suitable means or apparatus may be employed, so far as the compressing of terephthalic acid component having a bulk density less than 0.8 to raise its bulk density to at least 0.8, preferably greater than 0.9, and making of the average particle diameter of the component not more than 8 mm. by the compression only or with an additional step of crushing can be suitably carried out.

In the invention, thus by compression of terephthalic acid component, its bulk density can be readily raised to at least 0.8. The greater the compressive pressure employed at that time, the closer the bulk density of the compressed terephthalic acid component approaches to the specific gravity of terephthalic acid which is about 1.6–1.7. (The value is slightly varied according to method of measurement.)

Again, the more the compressed product is crushed, the smaller becomes its average particle diameter, but if the diameter is made too small, the bulk density will become less than 0.8. Therefore, in the invention the average particle diameter of the compressed product may be lowered down to such a degree as will not make the bulk density of the product less than 0.8.

In compressing the terephthalic acid component, if the material is in a moistened state, the compressing effect is increased, and its shaping is easier. However, it is also possible to compress or compress and shape dry terephthalic acid component to the desired degree.

According to the invention, it is most preferred to thus compress and shape the terephthalic acid component to a uniform shape, as a whole having an average particle diameter of not more than 8 mm.

In this invention, besides terephthalic acid, mixtures of terephthalic acid with one or more of other organic, bifunctional acids such as adipic, sebacic, isophthalic, bibenzoic acids, or of aromatic oxycarboxylic acids may be used. Whereas, the amount of such other organic bifunctional acid or acids to be mixed with terephthalic acid is normally kept within 25 mol percent based on the total acid component in case of producing fiber- or film-forming polyesters.

As the glycols to be reacted with the terephthalic acid component, aliphatic, cycloaliphatic and aromatic glycols of 2–10 carbon atoms, such as ethylene glycol, butylene glycol, neopentyl glycol, 1,4-dimethylol-cyclohexane; or glycols having ether bond such as diethylene glycol; or 2,2 - bis[4 - ($\beta$ - hydroxylethoxy)phenyl]propane may be used. These may be used singly or in combination.

The effects and advantages of practicing the invention are as follows.

To wit, when polyester is prepared by direct esterification using the terephthalic acid component produced in accordance with the invention, during the earlier half of batch-type esterification reaction, although the product takes form of a slurry of high concentration, the apparent viscosity of the slurry is much less than that of the reaction system using an acid component of low bulk density, and therefore the power required for stirring the slurry during the esterification reaction is remarkably reduced.

Again, the polyester produced by the direct esterification using the terephthalic acid component produced in accordance with the invention as the material has a high high quality, particularly has a uniform softening point and color tone. Still further advantage is that, if the terephthalic acid component of the invention is employed in continuous-type esterification, uniform stirring can be easily practiced even when the acid component and glycol component are fed separately into the reactor, and consequently the desired reaction can be easily and continuously performed. Again when the two components are fed into the reactor in form of a slurry, the transfer is very easy.

Again, when the terephthalic acid component of the invention is directly reacted with a glycol (direct esterification) to form bis-(hydroxyalkyl)-terephthalate or its low molecular weight polymer, the rate of reaction is in no way smaller than that in case of using a commercially sold terephthalic acid. This is also an unexpected advantage. And, by heating the bis-(hydroxyalkyl)-terephthalate or its low molecular weight polymer thus obtained under a reduced pressure, polyesters can be readily produced.

In the production of polyesters by the direct esterification using the product terephthalic acid component of the invention, as a direct esterification catalyst, such compounds as alkali metals, alkali earth metals, lead, zinc, manganese and cobalt may be added singly or in combination. Again at the time of polymerization, known catalysts such as compounds of antimony, germanium, titanium, zinc, tin and silicon may be added, and as a stabilizer, known phosphorus compounds may be added. It is also permissible to add known inorganic or organic pigments and/or dyestuffs for delustering and coloring.

Hereinafter the invention shall be explained with reference to the examples which follow, while it being understood that these in no sense limit the invention thereto. In the examples, color tone is the value set forth in ASTM, D1482–57T, and increase in $+b$ value denotes that the yellowing of the sample is increased.

Example 1

Fifteen (15) kg. of dispotassium terephthalate were dissolved in 110 liters of water and heated to 85° C. With stirring by a mechanical means, 6 N hydrochloric acid was gradually added to the solution until the pH of the solution at liquid phase reached 1, and the resulted precipitate was filtered by filter press. Thus obtained cake was made into a slurry with 100 liters of hot water, heated to 80° C. and stirred for 30 minutes, filtered under pressure, and then washed with about 50 liters of hot water. By crushing the resultant cake after drying, 10.0 kg. of terephthalic acid were obtained, which had a bulk density of 0.45.

A portion of thus obtained powdery terephthalic acid (A) having a bulk density of 0.45 was made into tablets (10$\phi$ x 3 m./m.) by compressing and shaping at room temperature by means of a rotary tabloid machine having the maximum tablet-forming pressure of 5 tons, and color tone of the product polymer obtained in the above-described operations shall be shown in the table below.

| Sample No. | Bulk density of terephthalic | Form of terephthalic acid | Maximum electric (kwh.) | Time required for esterification (min.) | Color tone b |
|---|---|---|---|---|---|
| 1 | 0.52 | Power (average 20μ) | 0.84 | 340 | 3.6 |
| 2 | 1.35 | Tablets (10φ x 3 m./m.) | 0.53 | 325 | 1.6 |
| 3 | 1.42 | Tablets (10φ x 3 m./m.) | 0.52 | 320 | 1.8 |
| 4 | 0.93 | Crushed tablets (less than 20 mesh). | 0.56 | 320 | 2.4 | crushed in a gutter mill. Thus obtained terephthalic acid tablets (B) had a bulk density of 0.86, and an average particle diameter of about 0.1 mm. At the time of compressing and shaping the terephthalic acid (A), its water content was 1.0%.

The terephthalic acids (A) and (B) were each made into a slurry with ethylene glycol, and the respective apparent viscosity of each slurry was measured at room temperature with a rotary viscosimeter. Thus obtained viscosity values of the slurries were as follows:

VISCOSITY OF SLURRY (POISE)

| E.G./terephthalic acid (mol) | Terephthalic acid | |
|---|---|---|
| | (A) | (B) |
| 1.6 | 300 | 68 |
| 2.0 | 280 | 48 |
| 3.0 | 120 | 14 |
| 4.0 | 25 | 2.4 |
| 6.0 | 6.9 | 1.5 |

Example 2

Seventy (70) kg. of monopotassium terephthalate were made into a slurry with 320 liters of water, heated to 90° C., and to the slurry 54.9 kg. of phthalic anhydride were gradually added with stirring. After stirring for an additional hour, the reaction product was filtered while it was hot by means of a centrifugal filtering machine, and was simultaneously washed with about 20 liters of hot water. Thus obtained cake was made into a slurry with 300 liters of hot water, heated to 80° C. and stirred for 30 minutes, filtered through a centrifugal filtering machine and was simultaneously washed with about 20 liters of hot water. When the resultant cake was dried and then crushed, 53 kg. of terephthalic acid having a bulk density of 0.52 were obtained. This terephthalic acid was compressed and shaped, and in some cases further crushed, to form terephthalic acids of various bulk densities. The compressing, shaping and crushing operations were carried out employing the same means and conditions as in Example 1.

Each 19.0 kg. of thus obtained terephthalic acids of various bulk densities were charged in an esterification autoclave with 12.8 kg. of ethylene glycol, 7.6 g. of zinc acetate and 11 g. of titanium oxide. After replacing the air inside the autoclave by nitrogen gas, the content was heated while stirred by a 1 horsepower motor wherein 2.5 kg./cm.$^2$ G of nitrogen gas was sealed (35 r.p.m.). After about an hour, the inside temperature was raised to 220° C., the temperature thereafter being maintained at that level. The water formed during the reaction was removed outside the reaction system through a packed tower, while the inside pressure was maintained at 2.50 kg./cm.$^2$ G. When the reaction was completed, the transparent, molten content was transferred to a polymerization vessel, and polymerized for 3.3 hours under a reduced pressure of 0.4 mm. Hg at 285° C., in the presence of 7.6 g. of phosphoric acid and 5.7 g. of antimony trioxide. As to each of the terephthalic acid, the maximum value indicated in the wattmeter of the motor for driving the stirrer, time required for the esterification, and the As is shown by the above table, when powdery terephthalic acid having a bulk density of 0.52 was used, the 1 horsepower stirring motor was overloaded, but as to other terephthalic acid having raised densities, the motor was run smoothly. The time required for the esterification is substantially the same in all cases regardless the density. Further, the color tone $b$ of the polymer was always lower when terephthalic acids of high density are used, i.e., yellowing of the polymer was less, which of course is always preferred.

Example 3

This is an example wherein a material having a low bulk density was used as a portion of the acid component. The operations of Example 2 were repeated using 1.9 kg. of isophthalic acid having a bulk density of 0.43, 17.1 kg. of the sample No. 3 terephthalic acid of Example 2, and 12.8 kg. of ethylene glycol. The maximum electric power required at the time of the esterification was 0.55 kwh., and the esterification was completed within 310 minutes. The resultant polymer had a color tone $b$ of 1.9, and a softening point of 235.4° C.

Example 4

The sample No. 1 terephthalic acid and the sample No. 4 terephthalic acid of Example 2 were each used as the material of 15 batch-operation in a plant under the same conditions as in Example 2. The results were as follows:

| Terephthalic acid | Average color tone b of polymer | Presumed average standard deviation | Average softening point (° C.) |
|---|---|---|---|
| Sample No. 1 | 3.43 | 0.59 | 256 |
| Sample No. 4 | 2.18 | 0.41 | 259 |

The above data prove that when the acid component of higher density was used, the polymer had better color tone and higher softening point.

Example 5

An esterification tank was charged with 13.8 kg. of the sample No. 3 terephthalic acid of Example 2, 16.8 kg. of 1,4-cyclohexane dimethylol (cis 30, trans 70) pre-heated to about 80° C., and 9.4 g. of titanium oxide, and within about 60 minutes, its inside temperature was raised to 238° C. and was maintained at the same level thereafter. The water formed was distilled off the reaction system through a distillation tower. The distillation of the water ended after 230 minutes from the time at which the inside temperature of the tank reached the aforesaid level. The content of the tank was then transferred to a polymerization vessel, and polymerized at 295° C. under a reduced pressure in the presence of 7.0 g. of tetrabutyl titanate. The intrinsic viscosity of the obtained polymer was 0.65. The maximum electric power required for stirring the content of the esterification tank in this example was 0.48 kwh., and the softening point of the polymer was 289.3° C.

We claim:
1. In a process for the preparation of polyesters by direct esterification wherein a terephthalic acid component selected from terephthalic acid or a mixture of terephthalic acid with less than 20% of another organic bifunctional carboxylic acid selected from the group consisting of dicarboxylic acids and oxycarboxylic acids is reacted directly with a glycol of 2 to 10 carbon atoms to form bis(hydroxy alkyl)-terephthalate or a low-molecular-weight polymer thereof with subsequent polymerization of the resultant reaction product by heating under reduced pressure, the improvement which comprises employing a terephthalic acid component produced by mechanically compressing said terephthalic acid component with a sufficient compressional force so as to produce particles having an average diameter of not more than 8 mm. and bulk density of at least 0.8, the average diameter of said particles being at least that necessary to obtain a bulk density of at least 0.8.

2. The process of claim 1 wherein the bulk density is at least 0.9.

3. The process of claim 1 wherein said glycol is ethylene glycol.

4. In a process for the preparation of polyesters by direct esterification wherein a terephthalic acid component selected from terephthalic acid or a mixture of terephthalic acid with less than 20% of another organic bifunctional carboxylic acid selected from the group consisting of dicarboxylic acids and oxycarboxylic acids is reacted directly with a glycol of 2 to 10 carbon atoms to form bis(hydroxy alkyl)-terephthalate or a low-molecular-weight polymer thereof with subsequent polymerization of the resultant reaction product by heating under reduced pressure, the improvement which comprises employing as said terephthalic acid component a material produced by mechanically compressing said terephthalic acid component and thereafter crushing the same so as to produce particles having an average diameter of not more than 8 mm. and a bulk density of at least 0.8, the average diameter of said particles being at least that necessary to obtain a bulk density of at least 0.8.

5. The process of claim 4 wherein the bulk density is at least 0.9.

6. The process of claim 4 wherein said glycol is ethylene glycol.

References Cited

UNITED STATES PATENTS 3,185,670   5/1965   McKinney _____ 260—75

FOREIGN PATENTS 22,747   10/1963   Japan.
977,426   12/1964   Great Britain.
868,338   3/1961   Great Britain.

WILLIAM H. SHORT, Primary Examiner.

M. GOLDSTEIN, Assistant Examiner.

U.S. Cl. X.R.

260—515